July 7, 1964
D. E. BLISS
3,140,115
DETACHABLE WINDSHIELD PROTECTOR
Filed March 28, 1962
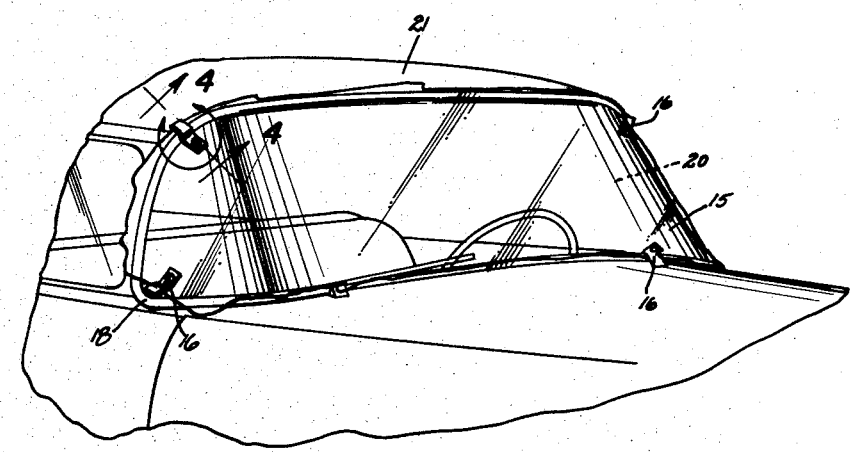
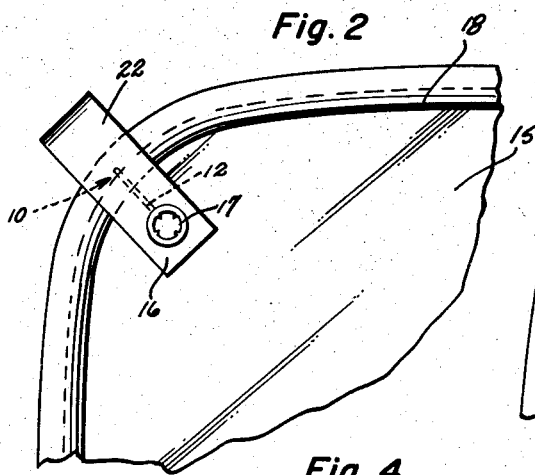
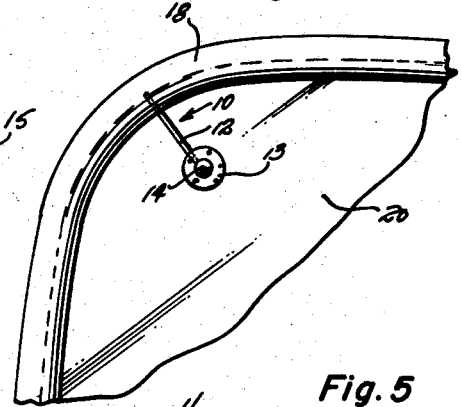
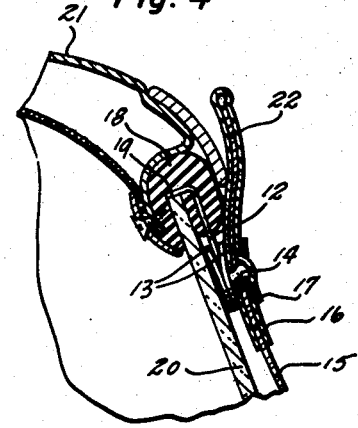
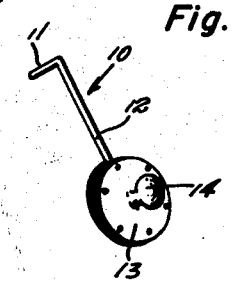
INVENTOR
Douglas E. Bliss

United States Patent Office 3,140,115
Patented July 7, 1964

3,140,115
DETACHABLE WINDSHIELD PROTECTOR
Douglas E. Bliss, 810 Ballenger Highway, Flint 4, Mich.
Filed Mar. 28, 1962, Ser. No. 183,179
2 Claims. (Cl. 296—95)

This invention relates to automobiles and the like and more particularly to a device for attaching a windshield protector on the windshield of the vehicle.

People have, from time to time added a protector over the windshield of their car to protect it from the elements when it is left out in the same for long periods of time. This is particularly true in the winter time in sections of the country where there is freezing rain and ice and snow.

As everyone who has ever had any experience in the colder climates with an automobile knows, the windshield will collect considerable ice and snow if left out very long in freezing rain or snow. The ice and snow is naturally rather difficult to remove from the windshield, particularly if the vehicle is not provided with de-icing equipment or it is inoperative. While a windshield protector will prevent this icing up of the windshield, there is always the problem of effectively securing the same to the windshield by some method that will permit its attachment and removal from the same in a minimum of time and with a minimum of effort.

It is therefore an object of this invention to provide a device for attaching a windshield protector to a windshield of an automotive vehicle that will permit the instant attachment and detachment of the windshield protector without the use of tools or the like.

Another object of this invention is to provide a device for attaching a windshield protector to a windshield of an automotive vehicle or the like by means of a plurality of hook attachments as will be hereinafter described.

Another object of this invention is to provide a device for attaching a windshield protector to the windshield of any automotive vehicle regardless of its make, age or model.

Another object of this invention is to provide a device for attaching a windshield protector to the windshield of an automotive vehicle or the like by means of a plurality of hook attachments that can be manufactured and retailed at a price within the reach of every automotive vehicle owner.

Another object of this invention is to provide a device for attaching any transparent windshield protector to the outside of any windshield of an automotive vehicle or the like.

Another object of this invention is to provide a device for attaching a windshield protector to the windshield of an automotive vehicle or the like without impairing the vision of the driver of the vehicle.

Still another object of this invention is to provide a device for attaching a windshield protector to the windshield of a vehicle that can also be used for attaching a similar protector of any window or the like no matter what the window may be the part of.

Other and further objects and advantages of this device for attaching a windshield protector will be hereinafter described, and the novel features thereof defined in the appended claims.

Referring to the drawing:

FIGURE 1 is a pictorial view of a typical windshield of an automobile with the present invention and windshield protector attached thereto.

FIGURE 2 is an enlarged view of that portion of FIGURE 1 as inclosed within the arrowed circle. The view is taken directly from the front looking towards the rear.

FIGURE 3 is a view similar to FIGURE 2 but without the windshield protector in place.

FIGURE 4 is a sectional view of this invention taken substantially along the line 4—4 of FIGURE 1 as viewed in the direction indicated by the arrows.

FIGURE 5 is a pictorial view of this invention ready to attach to the windshield of an automotive vehicle.

Similar reference characters refer to similar parts throughout the several views of the drawing.

Having reference now to the drawing in detail, there is generally indicated by the character 10 a device for attaching a windshield protector to the windshield of an automobile or any similar constructed object. The device which in its present embodiment is basically in the form of a hook consists of an L shaped hook 11 having its shank 12 terminating between and secured to a pair of substantially flat, circular members 13, the outer one of which has a centrally located button 14 thereon as clearly shown in FIGURES 4 and 5 of the appended drawing.

The windshield protector 15 which is of thin flexible transparent material of substantially the same size as the windshield of the vehicle on which it is intended to be used, though it may be slightly smaller in size, is provided with rectangular flexible strip 16 that is folded so as to contact both sides of the said windshield protector on which it is placed and secured by means of a female fastener or socket 17 that passes through the said protector 15 and one end of the said strip 16. The aforesaid female fastener 17 snaps on the aforesaid button 14 of the already described device 10, which has its hook 11 embedded in resilient rubber channel 18 and rests on the edge 19 of the windshield 20 of the automobile 21 as one can see on examination of FIGURE 4 of the appended drawing.

It is realized of course that a plurality of the just described devices 10 are used to secure the windshield protector 15 to the windshield 20. The devices 10 of which there is only four shown in the FIGURE 1 of the appended drawing, is normally placed one at each corner of the aforesaid windshield 20.

This novel invention has now been described in detail and its method of use is obvious from examination of the appended drawing where the outer end 22 of the flexible strip 16 normally projects out beyond the edge of the aforesaid windshield protector 15 and windshield 20 in order to provide a hand-hold for removing the said protector 15 from the windshield of the vehicle on which it is placed whenever desired.

From the foregoing it will now be seen that there is herein provided a device for attaching a windshield protector which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

What I now claim as my invention and desire to secure by Letters Patent is:

1. A windshield protector and its securing means for use with a windshield having a rubber windshield channel comprising; a plurality of flat members, a button having a neck and a slightly larger head secured to one side of each of the flat members, each flat member having a hook which is substantially L-shaped and circular in cross section, each hook having a shank secured to the flat member at one end and extending in the same plane as the flat member, the other end of the L-shaped hook extending in a direction perpendicular to the plane of the flat member and in a direction away from the button, whereby the flat member and hook can be turned sideways, the hook inserted in an opening in said rubber windshield channel and then turned to a position with the flat member resting on a windshield and the hook engaging the edge of said windshield, a flexible windshield protector of approximately the same size as the windshield, to be placed over the windshield, and a plurality of sockets secured to the protector at spaced points near the edge of the protector, which points will align with the positions of the buttons so that the sockets can snap over the buttons.

2. A windshield protector and its securing means for use with a windshield having a rubber windshield channel comprising; a plurality of flat members, a button having a neck and a slightly larger head secured to one side of each of the flat members, each flat member having a hook which is substantially L-shaped and circular in cross section, each hook having a shank secured to the flat member at one end and extending in the same plane as the flat member, the other end of the L-shaped hook extending in a direction perpendicular to the plane of the flat member and in a direction away from the button, whereby the flat member and hook can be turned sideways, the hook inserted in an opening in said rubber windshield channel and then turned to a position with the flat member resting on a windshield and the hook engaging the edge of said windshield, a flexible windshield protector of approximately the same size as the windshield, to be placed over the windshield, a plurality of elongated flexible strips, each of these strips secured to both surfaces of the protector, each strip extending from the edge of the protector towards the central portion of the protector, and a socket adapted to snap over one of said buttons, secured to each strip near the edge of the protector, the sockets and buttons to be positioned so that corresponding sockets and buttons are in alignment when the buttons and windshield protector are in place on a windshield.

References Cited in the file of this patent

UNITED STATES PATENTS

| | | |
|---|---|---|
| 1,533,731 | Foley | Apr. 14, 1925 |
| 2,389,002 | Schatzman et al. | Nov. 13, 1945 |
| 2,551,052 | Quish | May 1, 1951 |
| 2,801,948 | Walker | Aug. 6, 1957 |
| 2,944,601 | Compson | July 12, 1960 |

FOREIGN PATENTS

| | | |
|---|---|---|
| 611,191 | Canada | Dec. 27, 1960 |